United States Patent [19]

Rabo et al.

[11] Patent Number: 4,975,001
[45] Date of Patent: Dec. 4, 1990

[54] PLASTIC PIPE REBORING TOOL

[76] Inventors: Frederick N. Rabo, 2120 Oro-Chico Hwy., Durham, Calif. 95938; Steven J. Masonek, 7475 Cana Hwy., Chico, Calif. 95926

[21] Appl. No.: 468,012

[22] Filed: Jan. 22, 1990

[51] Int. Cl.⁵ ............................................. B23B 51/00
[52] U.S. Cl. ..................................... 408/82; 408/201; 408/239 R
[58] Field of Search ................ 30/172; 408/80, 81, 408/82, 83.5, 200, 201, 233, 227, 239 R

[56] References Cited

U.S. PATENT DOCUMENTS

| | | | |
|---|---|---|---|
| 1,460,838 | 7/1923 | Bean | 408/233 |
| 1,625,836 | 4/1927 | Tanguay | 408/227 |
| 3,289,297 | 12/1966 | Casselman et al. | 30/172 |
| 4,295,274 | 10/1981 | Bricher et al. | 30/172 |
| 4,580,934 | 4/1986 | McCormick | 408/227 |
| 4,693,643 | 9/1987 | Heyworth | 408/82 |
| 4,720,219 | 1/1988 | Masonek et al. | 408/225 |

*Primary Examiner*—Daniel W. Howell

[57] ABSTRACT

An improved plastic pipe reboring tool having an elongated shank, a generally concavo-convex cutting head, and changeable guide discs effective for cleaning residue glue and plastic from used plastic pipe and fittings so they can be used over again. The reboring tool is operational with both powered and manual chuck rotating devices and can be effectively used on different sizes of plastic pipe.

4 Claims, 4 Drawing Sheets

PLASTIC PIPE REBORING TOOL

BACKGROUND OF THE INVENTION

1. Field of the Invention:

This invention relates to an improved tool useful for reboring used plastic pipe fittings to remove residue of glue and plastic for reuse of the fittings. The present invention is particularly directed towards a simplified and improved arbor and cutting disc for field use in manual and electric drills.

2. Description of the Prior Art

The present invention constitutes an improvement in the reboring tool taught in U.S. Pat. No. 4,720,219 issued to F. N. Rabo and S. J. Masonek in 1988.

SUMMARY OF THE INVENTION

The immediate invention constitutes an improvement in an original concept of a threaded arbor fitted centrally through an internal guide disc and a cutting disc held in place by a left-handed nut. In the improved tool assemblage, an elongated arbor having a circumferential size and shape compatible with commonly used drill chucks, has a short threaded end shank removably accepting attachment of a generally concavo-convex cutting disc or head and a guide disc. The arbor is of sufficient length to move the cutting head into the pipe opening a useful distance and the cross section configuration of the arbor is normally hexagon, fitting most standard sizes used on drill chucks. A small portion at one end of the arbor has a reduced diameter producing a D-shaped shank having right-hand threads. Where the arbor reduction begins, an abutment or shoulder is provided against which an inside flattened connective cutting head base section surface on the concave side of the substantially concavo-convex cutting head abuts. An aperture sized to pass over the D-shaped shank is centered in the flattened cutting head base section allowing the cutting head to abut against the reduced end surface of the arbor. The cutting head has a generally concavo-convex structure with the flattened center section affixed with inherent cutting blades formed cup-like along the edges ringing the flattened center section. The blades are angled in fan-like alignment each presenting a cutting edge free of the cutting edge of adjoining blades. The cutting head can have multiple blades but the cutting is more efficient with a two or four bladed cutting head. The guide disc has a center aperture sized to slide-fit over the arbor shank threads and abuts against the flattened cutting head base section surface on the convex side of the cutting head. The guide disc is provided in different diametrically sized discs applicable to the interior diameter opening of a variety of single sized plastic pipes. This is to accommodate for variations in internal diameter of pipes which although are sold as a certain size such as two inch for example, actually vary slightly in internal diameter from one type of plastic pipe to another. Different varieties of pipe, such as PVC or ABS pipe are both available in two inch diameters, but have different internal diameters. A single disc is therefore selected and used accordingly. With the concave side flattened base surface of the cutting head abutted against the end surface of the arbor and the guide disc abutted against the convex side flattened base surface of the cutting head, the assemblage is maintained by a right-hand threaded fastener, a nut or a cap nut screwed onto the short threaded shank of the arbor. Of importance to the operation of the cutting head and disc assemblage is the fact that the threaded arbor shank is D-shaped having one flat side as is the aperture in the concavo-convex cutting head. Although the aperture in the cutting head slides over the threaded shank, the flat side of the aperture in the cutting head is close fitted to the flat side of the D-shaped threaded shank and the D-shape of the shank prevents the cutting head from turning independent of the arbor. The guide discs are operational with and without the D-shaped aperture as no retainer washers are used in this device and the guide disc held securely against the cutting head by the cap nut acts like a washer.

To use the improved reboring tool of the immediate invention, the substantially concavo-convex cutting head is slid onto the threaded shank of the arbor with the flat side of the arbor shank and the flat side of the cutting head aperture in parallel alignment. The concave side flattened base surface of the cutting head is abutted against the wide end of the arbor at the start of the short threaded D-shaped shank. A guide disc of a size useful with the diametrical size of the plastic pipe to be cleaned is selected and slid over the threaded shank through the guide disc aperture until the guide disc abuts the convex side flattened surface of the cutting head base. The cutting head and the guide disc are then locked in place by tightening a nut onto the end of the arbor threaded shank. Although any properly sized nut will work, a cap nut is preferred. With the cutting assemblage secured to the shank end of the arbor, the chuck insert end is placed in the chuck of any chuck rotating device, manual or powered, an electric drill being preferred. The plastic pipe or pipe fitting is then secured and the guide disc directed into the opening to be cleaned by the operator. Guided by the guide disc, the spinning cutting head will efficiently clean out residues of glue and plastic pipe from plastic pipe or used connector fittings so they can be used over again. Residue materials contacted by the guide disc are pushed aside and forced up along the concave wall of the cutting head. The near concavo-convex shape of the cutting head provides a curved insert surface allowing the cutting head to follow the guide disc along in the plastic pipe shaving off the inside glued pipe sections which require removal.

Therefore, a principle object of our improved reboring tool is to provide a shank and a cutting head usable with electric drills, manual drills, and other arbor rotational devices which has a near concavo-convex cutting head effective in cleaning residue glue and plastic from used plastic pipe and fittings so they can be use over again.

Another object of the invention is to provide a reboring tool for cleaning out used plastic pipe and fittings using a substantially concavo-convex cutting head which effectively cuts out pipe residue in a variety of plastic pipe sizes and types both pressure and DWV.

A further object of the immediate invention is to provide an improved plastic pipe reboring tool with variable guide discs and a reduced assemblage which does not require retainer washers to hold the assemblage together.

Other objects and the many advantages of the immediate invention will become understood by reading descriptions of numbered parts in the specification and comparing the described numbered parts with like numbered parts illustrated in the accompanying drawings.

DESCRIPTION OF PREFERRED EMBODIMENT

Figure 1:
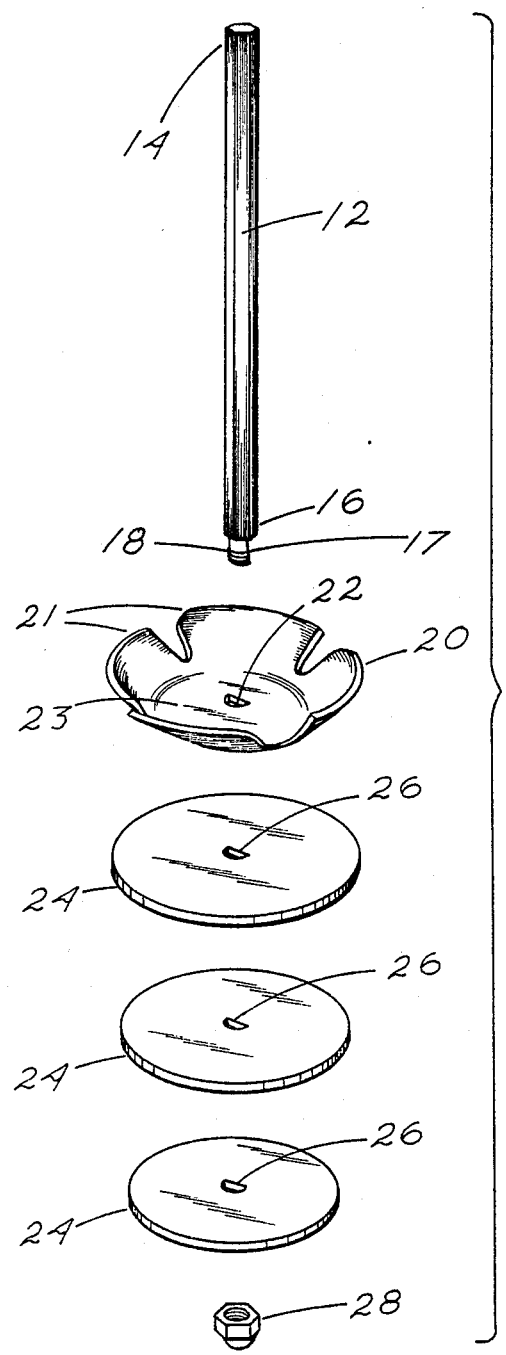
FIG. 1 shows an improved plastic pipe reboring tool according to the invention in an exploded view illustrating separated parts of the tool positioned for assemblage.
Figure 2:
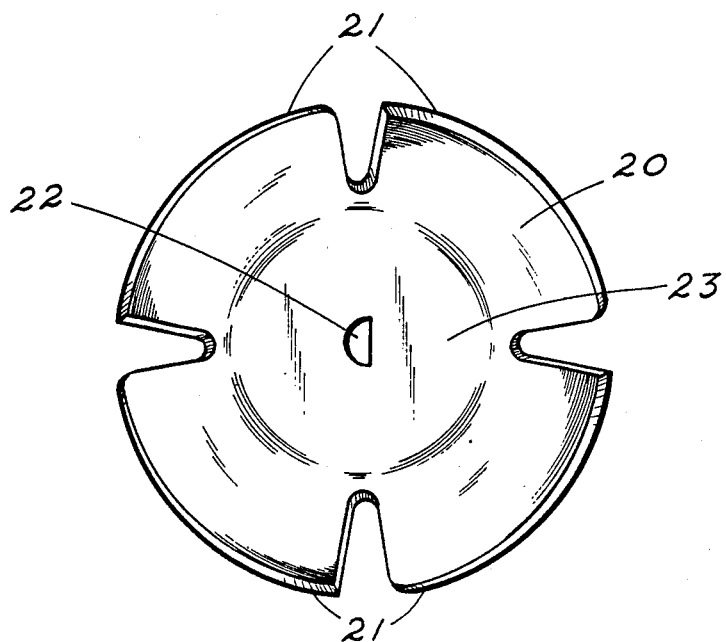
FIG. 2 is an enlarged top plan view of the generally concavo-convex cutting head showing the D-shaped aperture in the flattened center attachment base of the cutting head and the angled blade structure.
Figure 3:
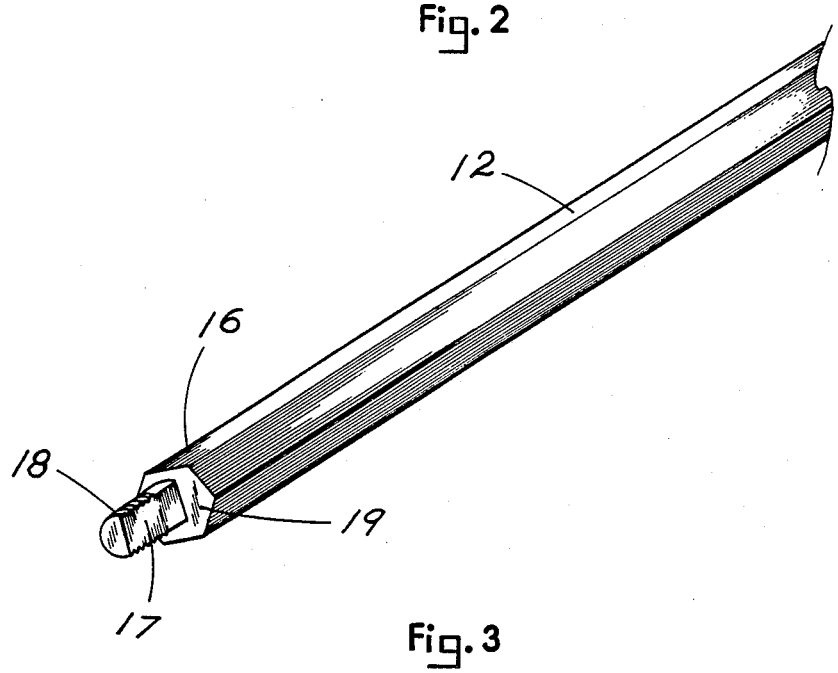
FIG. 3 shows the shank end of the arbor enlarged in a perspective view illustrating the D shape of the threaded shank.
Figure 5:
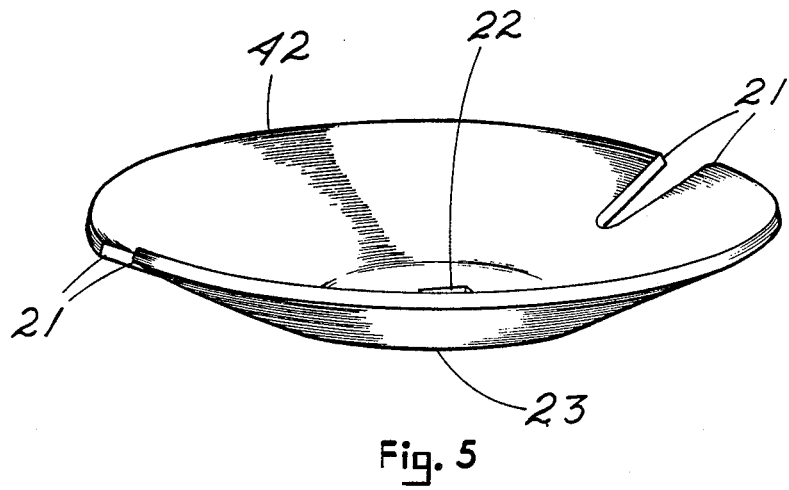
FIG. 5 is a perspective view of a cutting head illustrating a large size two-bladed cutting head.
Figure 6:
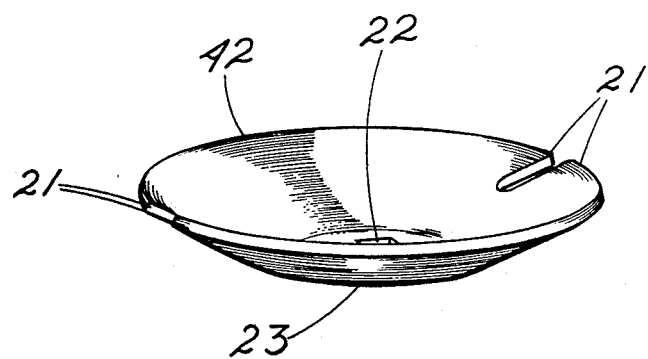
FIG. 6 is a perspective view of a small cutting head having two blades and showing a smaller sized cutting head to illustrate variations in the sizes of cutting heads for use in accordance with the diametrical size of the plastic pipe to be cleaned.

Referring now to the drawings in general where our improved reboring tool 10 is shown both separately and in use. At FIG. 1, the dissembled reboring tool 10 is shown with parts ready for assemblage. Arbor 12, having a first end designated arbor first end 14 and a second end designated arbor second end 16 for descriptive purposes, is shown with shank 18 at arbor second end 16 positioned downward above cutting head 20. Shank 18 is a short D-shaped right hand threaded diametrically reduced extension of arbor 12 at second end 16. The unthreaded planar surface section of shank 18 is referred to as flat surface 17. The reduced diameter of shank 18 provides a widened edge or shoulder 19 on second end 16. Cutting head 20 is a generally concavo-convex bladed structure having inherent cutting blades 21, in a concave arrangement along the edges cupping up from a center apex flattened into base section 23. Cutting head 20 can have multiple cutting blades 21 as shown in FIG. 1 and FIG. 2 in a four-bladed configuration but cutting is efficient with a two-bladed cutting head 42 as shown in FIG. 5 and in a smaller size in FIG. 6. FIG. 5 and FIG. 6 illustrate size variations in two-bladed cutting head 42 for use in different diameters of PVC and ABS pipe. Flattened base section 23 of cutting head 20 is for surface to surface abutment with shoulder 19 of arbor second end 16 on the concave side and to an upper surface of guide disc 24 on the convex side. In the FIG. 1 illustration, the D-shaped end of shank 18 is aligned with D-shaped aperture 22 in the flattened attachment area of base section 23 ready for slide-on attachment of cutting head 20 to shank 18. Illustrated in vertical alignment below cutting head 20, is a selection of different sizes of guide disc 24. Although cutting head 20 is available in different diametrical sizes, normally, only guide disc 24 need be supplied in different sizes with this variation dependent upon the residue and pipe thickness of an interior pipe being removed. See FIG. 4. With the single guide disc 24 selected, the tool can be assembled by sliding cutting head 20 up D-shaped threaded shank 18 so the concave surface side abuts against shoulder 19 of arbor second end 16 with the flat side of D-shaped aperture 22 and the flat side of D-shaped threaded shank 18 in close parallel alignment. This D-shape alignment provides a braking retainer so cutting head 20 has a positive attachment to arbor 12 and can be driven rotationally when arbor 12 is turned. The selected single guide disc 24 is slid up under cutting head 20 with D-shaped thread shank 18 passed through guide disc aperture 26. Guide disc 24 abuts to the flat surface of base section 23 on the convex side of cutting head 20 and a retainer nut, cap nut 28, screws on D-shaped threaded shank 18 locking the assemblage together. Although guide disc aperture 26 can be D-shaped, guide disc 24 is functional with guide disc aperture 26 normally round. Though guide disc 24 is sized for and leads cutting head 20 along the plastic pipe bore, guide disc 24 also acts as a washer against which cap nut 28 locks down to hold the cutting end assemblage eliminating the need for other washers and lock nuts. See the assembled in use illustration at FIG. 4.

In FIG. 2, an enlarged top plan view of cutting head 20 can be seen. D-shaped aperture 22 is centrally positioned in base section 23 of cutting head 20 and cutting head inherent blades 21 curve up and form an angled cupping around cutting head base section 23. Base section 23 is a flattened connective area at the apex of the convex outer surface of the generally concavo-convex structure of cutting head 20. As can be seen from the FIG. 2 illustration, blades 21 are angled fan-like so that one corner of a first blade dips below a corner of a second blade and in this manner, each blade provides an angled cutting edge. This fan-like and angled arrangement which exposes the corner edges of blades 21 is very effective for shaving cut off sections of used plastic pipe 36 and residue glue from inside a plastic pipe fitting so the fitting can be used again.

Figure 4:
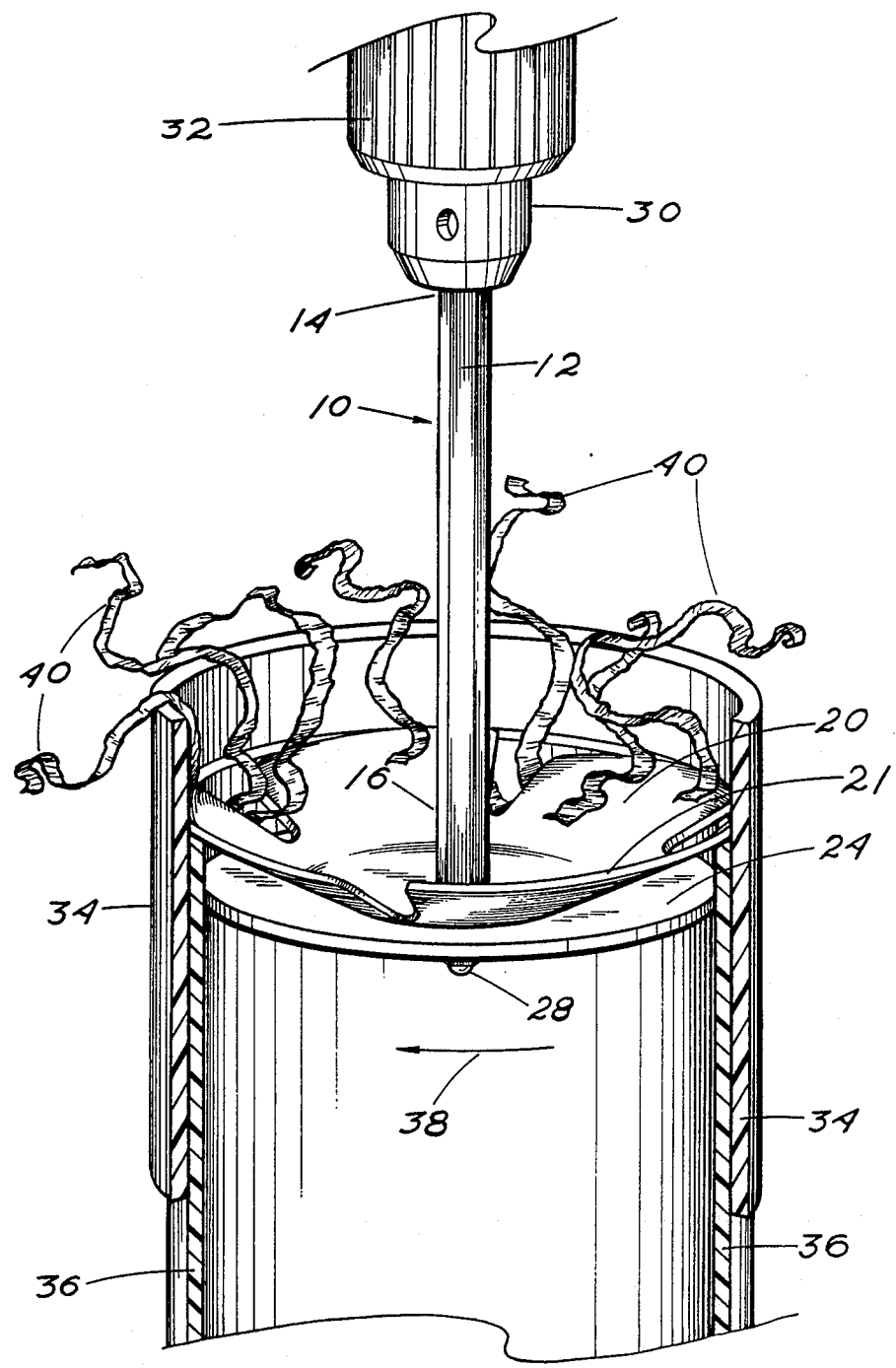
FIG. 4 is a perspective view of the reboring tool according to the invention showing a four bladed cutting head in use being turned by the tool shaft attached to the chuck of a rotating device. A sectioned view of a used plastic pipe end shows glue and a plastic pipe section being shaved out of a coupling by the near concavo-convex cutting head following the guide disc into the pipe opening.

FIG. 4 shows improved reboring tool 10 in a perspective assembled and in use view. Arbor 12 with arbor first end 14 inserted into rotatable chuck 30 is illustrated being turned by chuck rotating device 32. Chuck rotating device 32 could be a variety of powered and manually operated tools including everything from a brace and bit to a rotational air gun. A preferred rotational device 32 would be an electric hand drill. In the FIG. 4 illustration, glue and a plastic pipe section is shown being shaved out of a coupling by the cutting head 20 being turned and following the guide disc 24 along the pipe opening. Plastic pipe shavings and glue residue 40 are curling up over the generally concavo-convex structure of cutting head 20. This illustrates results produced by the near concavo-convex shape of cutting head 20. Plastic pipe coupling 34 with the end of plastic pipe 36 glued inside is shown opened in a sectional view to illustrate how blades 21 edging cutting head 20 turning clockwise, turn direction 38, following guide disc 24 shave out plastic pipe shavings and glue residue 40 to condition plastic pipe coupling 34 for reuse.

As we have described a particular embodiment of improved reboring tool 10 with considerable details in the foregoing specification and illustrated the embodiment in the drawings, it is understood that these disclosures are for illustrative purposes only. A person skilled in the art might realign blades 21 and reverse the position of cutting head 20 relative to arbor 12 even though this reversal would diminish the space between cutting head 20 and guide disc 24 reducing the upthrow of plastic pipe shavings and glue residue 40. The device, however, so changed could still be effective using the generally concavo-convex structure of cutting head 20. Therefore, we reserve exclusive rights to modify our device as described and in any other ways which improve effectiveness so long as modifications made remain within the intended scope of the appended claims.

What we claim as our invention is:

1. An improved plastic pipe reboring tool having a removably attached single piece concavo-convex shaped cutting head and an exchangeable guide disc for extraction of glue and plastic from used plastic pipe fittings, said reboring tool comprising an elongated arbor having means at a first end thereof for fitting a rotatable chuck of a tool, said arbor having means at a second end thereof for connection of said removably attached single piece concavo-convex shaped cutting head in a fixed position relative to said arbor, said second end of said arbor having means for attachment of said exchangeable guide disc with both said single piece concavo-convex shaped cutting head and said guide disc releasably maintained on said arbor, wherein said single piece concavo-convex shaped cutting head and said guide disk are releasably maintained by a removable fastener affixed to a free terminal end of said second end of said arbor.

2. The device of claim 1 wherein said arbor having means at said second end for connection of said removably attached single piece concavo-convex shaped cutting head in a fixed position relative to said arbor includes for said connection a short D-shaped threaded shank structure at a terminal end of said second end of said arbor with said single piece concavo-convex shaped cutting head fitting said shank in a retained position through close positioning of a flat side of a D-shaped aperture in said single piece concavo-convex shaped cutting head and a flat side of D-shaped structure of said shank with said cutting head aperture sized for slide-on connection to said shank.

3. The device of claim 1 wherein said connection of said removably attached single piece concavo-convex shaped cutting head in a fixed position relative to said arbor includes said cutting head abutting a shoulder of said arbor.

4. The device of claim 1 wherein said single piece concavo-convex shaped cutting head has a flattened center section affixed with cutting blades ringing said flattened center section with said blades angled in fan-like alignment each presenting a cutting edge free of the trailing edge of adjoining said blades.

* * * * *